United States Patent
Peppler

(10) Patent No.: US 6,382,342 B1
(45) Date of Patent: May 7, 2002

(54) HYDRAULICALLY POWERED STEERING APPARATUS WITH ELECTRICALLY POWERED BACKUP

(75) Inventor: Steven A. Peppler, West Lafayette, IN (US)

(73) Assignee: TRW Inc., Lyndhurst, OH (US)

(*) Notice: Subject to any disclaimer, the term of this patent is extended or adjusted under 35 U.S.C. 154(b) by 9 days.

(21) Appl. No.: 09/597,003

(22) Filed: Jun. 20, 2000

(51) Int. Cl.$^7$ .............................................. B62D 5/00
(52) U.S. Cl. ..................... 180/407; 180/404; 180/405
(58) Field of Search .............................. 180/405, 407, 180/404, 406

(56) References Cited

U.S. PATENT DOCUMENTS

| | | | |
|---|---|---|---|
| 3,734,226 A | * 5/1973 | MacDuff ..................... 180/79.2 |
| 3,847,243 A | * 11/1974 | Barth ............................ 180/79.2 |
| 3,877,537 A | * 4/1975 | Ohms et al. .................... 180/6.3 |
| 3,954,147 A | * 5/1976 | Hollins ........................... 180/133 |
| 4,869,334 A | * 9/1989 | Marumoto et al. .......... 180/79.1 |
| 4,942,803 A | 7/1990 | Rabe et al. |
| 5,080,186 A | * 1/1992 | Elser et al. .................... 180/142 |
| 5,097,420 A | * 3/1992 | Morishita ................ 364/424.05 |
| 5,184,693 A | 2/1993 | Miller |
| 5,257,670 A | 11/1993 | Miller et al. |
| 5,709,281 A | 1/1998 | Sherwin et al. |
| 5,845,736 A | 12/1998 | Bohner et al. |
| 5,931,256 A | * 8/1999 | Langkamp .................... 180/422 |
| 6,076,626 A | * 6/2000 | Bohner et al. ................ 180/402 |
| 6,112,844 A | * 9/2000 | Bohner et al. ................ 180/403 |
| 6,134,491 A | * 10/2000 | Kawagoe et al. ............... 701/43 |
| 6,213,246 B1 | * 4/2001 | Bohner et al. ................ 180/403 |
| 6,213,249 B1 | * 4/2001 | Noro et al. ................... 180/446 |
| 6,279,675 B1 | * 8/2001 | Bohner et al. ................ 180/403 |
| 6,285,936 B1 | * 9/2001 | Bohner et al. ................. 701/41 |

* cited by examiner

Primary Examiner—Brian L. Johnson
Assistant Examiner—Deanna Draper
(74) Attorney, Agent, or Firm—Tarolli, Sundheim, Covell, Tummino & Szabo L.L.P.

(57) ABSTRACT

An apparatus (10) for turning the steerable wheels (17) of a vehicle in response to the turning of the steering wheel (12). The apparatus (10) includes a drive mechanism (16), a first motor (24), a second motor (74), a sensor (78) for sensing that the first motor (24) is inoperative, and a torque sensor (80). In response to the turning of the steering wheel (12), the drive mechanism (16), is actuated, resulting in a turning the steerable wheels (17). The first motor (24), for inputting motion to the drive mechanism (16), is hydraulically powered. The second motor (74), for inputting motion to the drive mechanism (16), is electrically powered. The sensor (78) for sensing that the first motor (24) is inoperative produces an enabling signal and communicates the enabling signal to the second motor (74) to enable the operation of the second motor (74). The torque sensor (80) responds to the turning of the steering wheel (12) and controls the second motor (74) when the second motor (74) is enabled.

9 Claims, 2 Drawing Sheets

HYDRAULICALLY POWERED STEERING APPARATUS WITH ELECTRICALLY POWERED BACKUP

TECHNICAL FIELD

The present invention relates to an improved power steering apparatus for a vehicle and, more particularly, to a hydraulically powered steering apparatus having an electrically powered backup.

BACKGROUND OF THE INVENTION

A typical power steering apparatus for a vehicle is hydraulically operated. The apparatus includes a pump that is powered by the vehicle engine. The pump circulates hydraulic fluid though a hydraulic system containing a fluid reservoir. The pressurized hydraulic fluid is utilized by the power steering apparatus to aid the vehicle driver in turning the steerable wheels of the vehicle.

U.S. Pat. No. 4,942,803 discloses a hydraulic power steering gear. The power steering gear has a housing defining a fluid chamber, and a piston in the fluid chamber. The piston contains rack teeth that mesh with the teeth of a sector gear. The sector gear is fixed on an output shaft that transmits its movement to the respective wheels. The power steering gear is connected to a steering wheel of the vehicle by a shaft. When the vehicle driver turns the steering wheel, the shaft rotates a valve core part of the steering gear with respect to a valve sleeve part of the steering gear. This action causes hydraulic pressure to move the piston.

If the hydraulic power steering apparatus becomes inoperative, a driver must manually be able to steer the vehicle. To allow this manual steering when the hydraulic system is inoperative, the valve core part, the valve sleeve part, and the piston become mechanically linked. Thus, turning the steering wheel causes the valve core part and the valve sleeve part to turn and the piston to move, resulting in manual steering of the vehicle.

Although the manual steering of the vehicle is effective, this steering is difficult, particularly for large vehicles. As a result, there is a need for a system to assist with the steering of a vehicle should the hydraulic system become inoperative.

SUMMARY OF THE INVENTION

The present invention is an apparatus for turning steerable wheels of a vehicle. The apparatus includes a drive mechanism, a first motor, a second motor, a sensor for sensing that the first motor is inoperative, and a torque sensor. The drive mechanism is responsive to the turning of the steering wheel of the vehicle, and motion of the drive mechanism turns the steerable wheels. The first motor, for inputting motion to the drive mechanism, is hydraulically powered. The second motor, for inputting motion to the drive mechanism, is electrically powered. The sensor for sensing that the first motor is inoperative produces an enabling signal and communicates the enabling signal to the second motor to enable the operation of the second motor. The torque sensor responds to the turning of the steering wheel and controls the second motor when the second motor is enabled. The first motor is a hydraulically powered. The second motor is electrically powered and preferably includes a motor drive circuit for controlling operation of the second motor. If the driver-applied torque to the steering wheel reaches a predetermined level, the torque sensor communicates a torque signal to the motor drive circuit. The motor drive circuit controls the second motor in accordance with the torque signal.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF AN EMBODIMENT OF THE INVENTION

Figure 1:
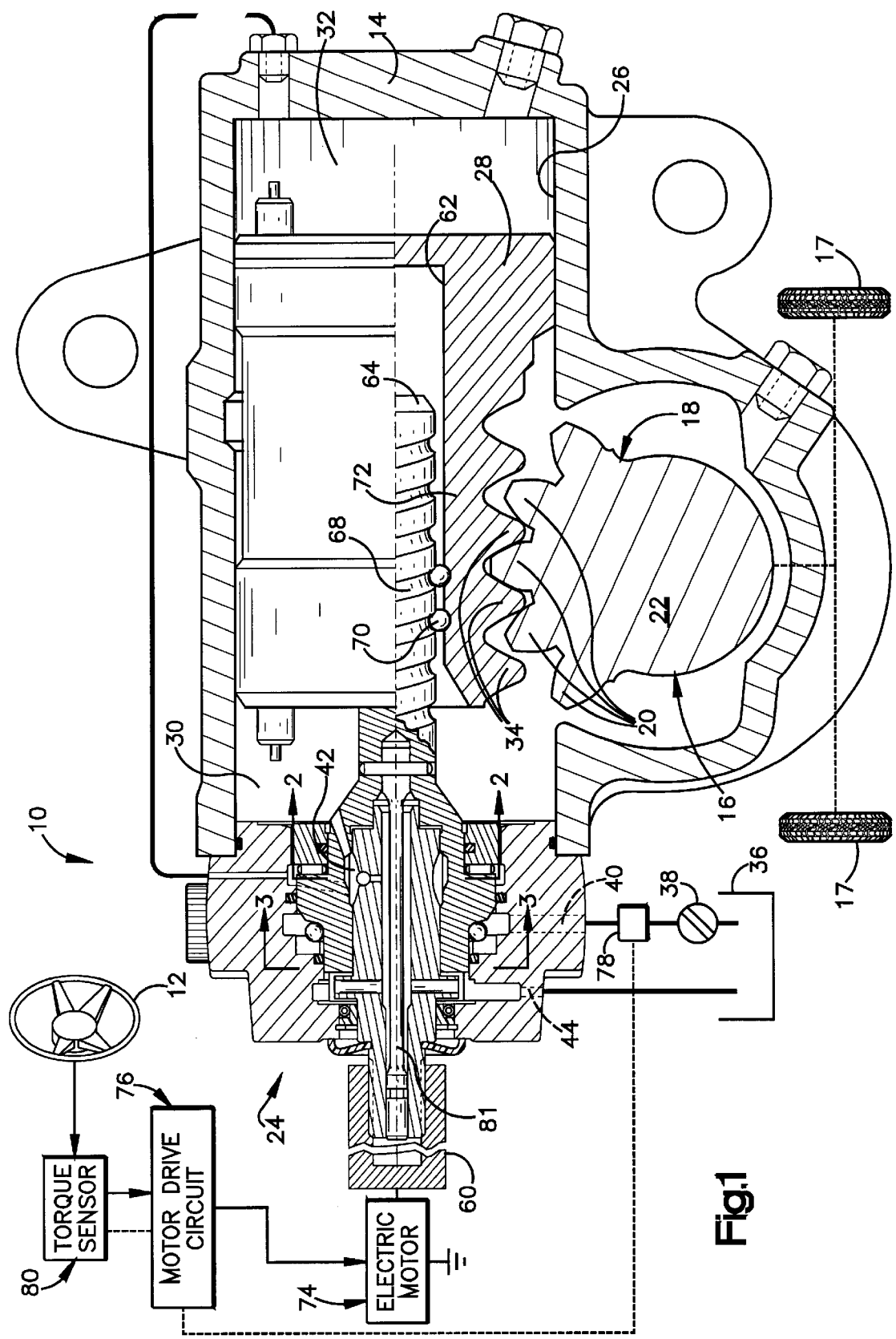
FIG. 1 is a schematic illustration of the apparatus of the present invention.

FIG. 1 illustrates an apparatus 10 embodying the present invention. The apparatus 10 is a vehicle power steering system for turning steerable wheels 17 of a vehicle in response to turning of a steering wheel 12 of the vehicle. The apparatus 10 includes a housing 14 that contains a portion of a drive mechanism 16 for turning the steerable wheels 17 of the vehicle. The drive mechanism 16 is actuated in response to turning of the steering wheel 12 of the vehicle. The motion of the drive mechanism 16 results in a turning of the steerable wheels 17.

The drive mechanism 16 includes a sector gear 18 having a plurality of teeth 20. The sector gear 18 is fixed on an output shaft 22 that extends outwardly through an opening in the housing 14. The output shaft 22 is typically connected to a pitman arm that is connected to the steering linkage of the vehicle. The dashed lines in FIG. 1 represent the pitman arm and steering linkage. Thus, as the sector gear 18 rotates, the output shaft 22 is rotated to operate the steering linkage. As a result, the steerable wheels 17 are turned.

The apparatus 10 further includes a first motor 24 for inputting motion to the drive mechanism 16. The first motor 24 is hydraulically powered. The housing 14 of the apparatus 10 has an inner cylindrical surface 26 defining a chamber. A piston 28 is located within the chamber and divides the chamber into opposite chamber portions 30 and 32. One chamber portion 30 or 32 is located on each end of the piston 28. The piston 28 creates a seal between the respective chamber portions 30 and 32 and is capable of axial motion within the chamber. This axial motion of the piston 28 results in an increase in volume of one portion of the chamber 30 or 32 and a corresponding decrease in the volume of the other portion of the chamber 30 or 32. A series of rack teeth 34 is formed on the periphery of the piston 28. The rack teeth 34 mesh with the teeth 20 formed on the sector gear 18 of the drive mechanism 16.

The first motor 24 is powered by hydraulic fluid that is pumped from a reservoir 36 to the first motor 24 by a feed pump 38. Generally, the engine of the vehicle drives the feed pump 38. The feed pump 38 forces hydraulic fluid into an inlet 40 that directs the flow of the fluid to a directional control valve 42. The directional control valve 42 controls the first motor 24. When the steering wheel 12 of the vehicle is turned, the directional control valve 42 directs the flow of hydraulic fluid to one of the appropriate chamber portions 30 or 32. The flow of hydraulic fluid to the respective chamber portion 30 or 32 increases the pressure within that chamber portion 30 or 32 and causes the piston 28 to move, causing the volume of that particular chamber portion 30 or 32 to increase. The volume of the particular chamber portion 30 or 32 increases until the pressure within each chamber portion 30 and 32 equalizes. As the volume of one chamber portion 30 or 32 increases to accommodate the increased fluid, the volume of the other chamber portion 30 or 32 decreases. The decreasing chamber portion 30 or 32 is vented to allow a portion of the contained hydraulic fluid to escape. This escaping fluid exits the housing 14 via the return 44 and is directed into the reservoir 36.

Figure 2:
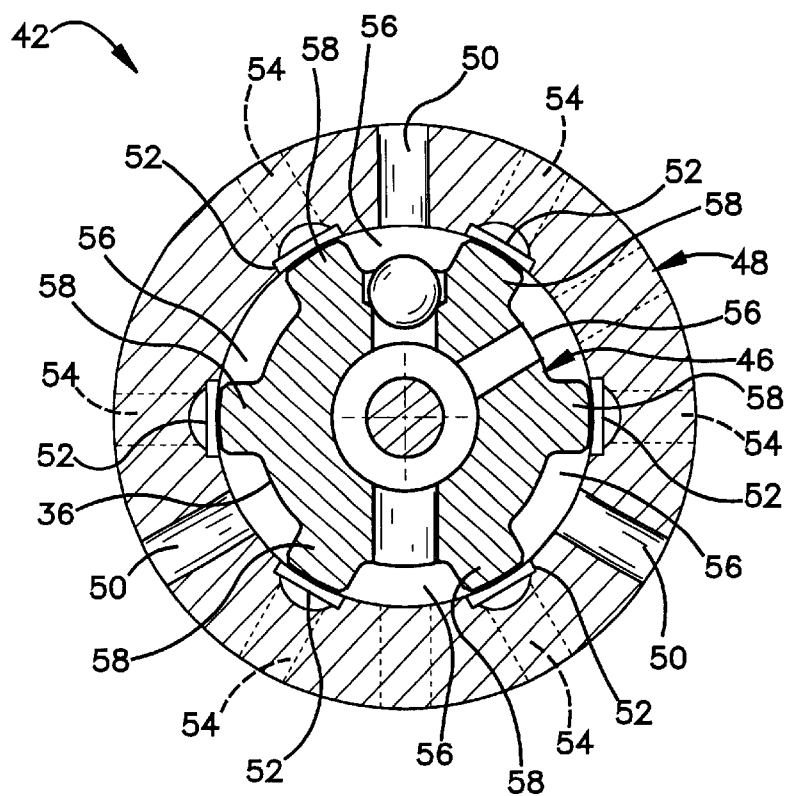
FIG. 2 is a cross-sectional view taken along line 2—2 of FIG. 1.

An embodiment of the directional control valve 42 that controls the first motor 24 is shown in FIG. 2. The directional control valve 42 contains a valve core part 46 and a valve sleeve part 48. A portion of the valve core part 46 is contained within and is rotatable relative the valve sleeve part 48.

The valve sleeve part 48 contains a plurality of radially directed passages 50 that extend from its outer circumference to its inner circumference. Each of these radial passages 50 is fed with hydraulic fluid that enters the housing 14 through the inlet 40. Two axially extending grooves 52 are associated with each radial passage 50. The axially extending grooves 52 are located on the inner circumference of the valve sleeve part 48. One groove 52 is located on each side of a respective radial passage 50 and each groove 52 is spaced an equal distance from the respective radial passage 50. Each groove 52 leads to a passage 54 extending radially outward of the valve sleeve part 48. Each groove 52 and associated passage 54 on a particular side of a radial passage 50 is associated with a particular chamber portion 30 or 32. For example, with reference to FIG. 2, each groove 52 and associated passage 54 located immediately clockwise of a radial passage 50 will supply hydraulic fluid to chamber portion 32; whereas, each groove 52 and associated passage 54 located immediately counter-clockwise from a radial passage 50 will supply hydraulic fluid to chamber portion 30.

The valve core part 46 includes a plurality of axially extending grooves 56 on its outer circumference. These axially extending grooves 56 form a plurality of protrusions 58 that form the sides of each groove 56. The valve core part 46 has one protrusion 58 for each valve sleeve part groove 52.

When the valve core part 46 is located relative to the valve sleeve part 48 such that each protrusion 58 of the valve core part 46 is centered above a respective groove 52 of the valve sleeve part 48, the directional control valve 42 is in a neutral position. FIG. 2 illustrates the directional control valve 42 in the neutral position. In this neutral position, the flow of hydraulic fluid passing from the radial passages 50 is distributed equally to the two associated grooves 52. As a result, the pressure within each chamber portion 30 and 32 is equalized. When the valve core part 46 is rotated, access to one of the two associated grooves 52 of the valve sleeve part 48 is restricted by a protrusion 58, while access to the other of the two associated grooves 52 is increased. This allows a greater amount of the hydraulic fluid into the open groove, resulting in a pressurizing of the respective chamber portion 30 or 32 to cause the piston 28 to move in a particular direction. For example, if the valve core part 46 is rotated clockwise, the associated valve sleeve part groove 52 located on the counter-clockwise side of the radial passage 50 becomes blocked and the associated groove 52 located on the clockwise side of the radial passage 50 becomes open. Thus, a greater amount of the hydraulic fluid enters the open groove and travels to the chamber portion 30 or 32 associated with the open groove. The increased hydraulic fluid in the respective chamber portion 30 or 32 increases the pressure within the respective chamber portion 30 or 32 and forces the piston 28 to move in an axial direction to increase the volume of the respective chamber portion 30 or 32. As a result, the piston 28 rotates the sector gear 18 and the steerable wheels 17 are turned in the appropriate direction.

The valve core part 46 of the directional control valve 42 is fixedly connected to a manually rotatable shaft 60. The manually rotatable shaft 60 is fixedly connected to the steering wheel 12 and may be manually turned by the driver of the vehicle.

The piston 28 contains a bore 62 that is open toward the directional control valve 42. The valve sleeve part 48 and a follow-up member 64 form an integral one-piece unit 66 that is supported for rotation by a plurality of bearings. The follow-up member 64 has a screw thread portion 68 formed on its outer periphery. A plurality of balls 70 is located in the screw thread portion 68. The balls 70 interconnect the screw thread portion. 68 of the follow-up member 64 with an internal treaded portion 72 formed in the bore 62 of the piston 28. As a result of the interconnecting balls 70, axial movement of the piston 28 causes the follow-up member 64 to rotate. This action causes the follow-up member 64 and the valve sleeve part 48 to rotate along with the valve core part 46 to return the directional control valve 42 to the neutral position.

In addition to the first motor 24, the apparatus 10 has a second motor 74 for inputting motion to the drive mechanism 16. The second motor 74 is electrically powered. The second motor 74 is coaxial with the manually rotatable shaft 60 located between the valve core part 46 and the steering wheel 12 of the vehicle. The second motor 74, when actuated, rotates shaft 60 through a suitable drive (not shown). The second motor 74 provides a backup source of power steering and is not activated unless the first motor 24 becomes inoperative. The second motor 74 includes a motor drive circuit 76 that directly controls the operation of the second motor 74.

The apparatus 10 includes a sensor 78 for sensing that the first motor 24 is inoperative. Although a variety of sensors may be used, in a preferred embodiment, the sensor 78 is a pressure sensor that monitors the pressure of the hydraulic fluid entering the apparatus 10 from the reservoir 36. Those skilled in the art will understand that the sensor 78 may be located at any pressurized point in the hydraulic fluid system.

Upon sensing that the first motor 24 is inoperative, the sensor 78 produces an enabling signal. The sensor communicates the enabling signal to the second motor 74 to enable operation of the second motor 74. In the preferred embodiment, the motor drive circuit 76 receives the enabling signal and enables the second motor 74.

The apparatus 10 further includes a torque sensor 80 that is responsive to turning of the steering wheel 12. If the first motor 24 becomes inoperative, the driver-applied torque on the steering wheel 12 required to turn the steerable wheels 17 increases. If the second motor 74 is enabled and the driver-applied torque reaches a predetermined level, the torque sensor 80 communicates a torque signal to the motor drive circuit 76. In response to the torque signal, the motor drive circuit 76 controls the second motor 74 to assist in turning the manually rotatable shaft 60 in the appropriate direction and thus, actuates the drive mechanism 16 to turn the steerable wheels 17. The mechanism of the second motor 74 that assists in rotating the rotatable shaft 60 can be any suitable drive mechanism.

Figure 3:
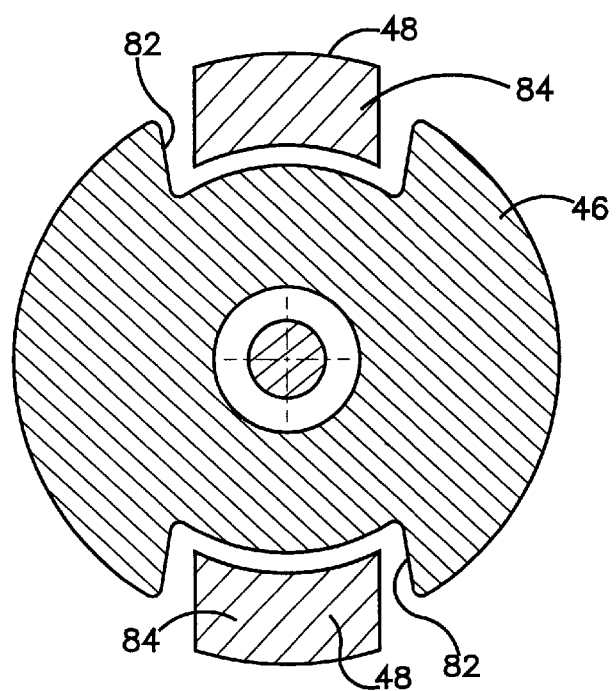
FIG. 3 is a cross-sectional view taken along line 3—3 of FIG. 1.

A torsion bar 81 is fixed between the manually rotatable shaft 60 and the follow-up member 64. At least a portion of the torsion bar 81 extends through an axially extending bore in the valve core part 46. If the first motor 24 becomes inoperative, driver-applied torque to the manually rotatable shaft 60 is transferred through the torsion bar 81 in an attempt to cause rotation of the follow-up member 64. If the resistance to turning of the steerable wheels 17 is below a predetermined level, the torque transferred through the torsion bar 81 will cause rotation of the follow-up member 64 which, in turn, causes movement of the piston 28 and results in turning the steerable wheels 17. If resistance to turning the steerable wheels 17 is at or above a predetermined level, the torsion bar will twist causing the valve core part 46 to engage and drive the valve sleeve part 48. As seen in FIG. 3, the valve core part 46 has a plurality of recesses 82 in its outer periphery. An equal number of driving lugs 84 project axially from the valve sleeve part 48 and into the recesses 82 in the valve core part 46. After a small amount of relative rotation between the valve parts 46 and 48, usually no more than a few degrees, the side surfaces of the recesses 82 of the valve core part 46 will engage the driving lugs 84 of the valve sleeve part 48 resulting in a positive drive between the two valve parts 46 and 48. Further rotation of this positive drive will cause rotation of the follow-up member 64 in the direction of rotation of the manually rotatable shaft 60. The balls 70 interconnecting the follow-up member 64 with the bore 62 of the piston 28 cause the piston 28 to move axially within the chamber. This axial movement of the piston 28 causes the sector gear 18 to rotate and results in the turning of the steerable wheels 17 of the vehicle. During the movement of the piston 28, the chamber portions 30 and 32 are both vented to allow the movement of the piston 28 to displace the necessary hydraulic fluid.

In the preferred embodiment of the apparatus 10 of the present invention, when the sensor 78 senses that the first motor 24 is inoperative, the sensor 78 produces an enabling signal and communicates the enabling signal, via the motor drive circuit 76, to enable the second motor 74. The enabling signal is received by the motor drive circuit 76 which enables the second motor 74 and becomes responsive to the torque sensor 80. When the driver-applied torque reaches a predetermined level, the torsion bar 81 twists and the side surfaces of the recesses 82 of the valve core part 46 engage the driving lugs 84 of the valve sleeve part 48. When the driver-applied torque reaches a second predetermined level, the torque sensor 80 communicates a torque signal to the motor drive circuit 76. This torque signal includes the direction, clockwise or counter-clockwise, of the driver-applied torque. Upon receiving the torque signal, the motor drive circuit 76 controls the second motor to assist in the turning of the manually rotatable shaft 60. For example, if the torque signal communicates a clockwise driver-applied torque that reaches the second predetermined torque level, the motor drive circuit 76 will direct the second motor 74 to assist in turning the manually rotatable shaft 60 in a clockwise direction. When the driver-applied torque falls below the second predetermined level, the torque sensor 80 will terminate the torque signal and the motor drive circuit 76 will stop the rotation of the second motor 74.

The present invention provides an improved power steering apparatus 10 having a first motor 24 to actuate a drive mechanism 16 and a second motor 74 backup to actuate the drive mechanism 16 if the first motor 24 becomes inoperative. Additionally, the apparatus 10 allows manual steering of the vehicle if both motors become inoperative. It should be clear to one skilled in the art that certain modifications, changes, and improvements of the present invention may be made. Such modifications, changes, and improvements are intended to be covered by the appended claims.

Having described the invention, I claim:

1. An apparatus for turning steerable wheels of a vehicle in response to turning of the steering wheel of the vehicle, the apparatus including:

a drive mechanism for turning the steerable wheels, the drive mechanism being responsive to the turning of the steering wheel, motion of the drive mechanism turning the steerable wheels;

a first motor for inputting motion to the drive mechanism, the first motor being hydraulically powered;

a second motor for inputting motion to the drive mechanism only when the first motor is inoperative, the second motor being electrically powered;

a sensor for sensing that the first motor is inoperative, the sensor producing an enabling signal and communicating the enabling signal to the second motor to enable operation of the second motor; and a torque sensor, the torque sensor being responsive to turning of the steering wheel, the torque sensor controlling the second motor when the second motor is enabled.

2. The apparatus for turning steerable wheels of a vehicle as defined in claim 1, the apparatus further being defined by:

a motor drive circuit for controlling the second motor, the torque sensor communicating a torque signal to the motor drive circuit, the motor drive circuit controlling the second motor.

3. The apparatus for turning steerable wheels of a vehicle as defined in claim 2, the apparatus further being defined by:

the second motor inputting motion to the drive mechanism when the second motor is enabled and the torque sensor senses that a driver-applied torque on the steering wheel has reached a first predetermined level.

4. The apparatus for turning steerable wheels of a vehicle as defined in claim 3, the apparatus further being defined by:

a valve core part rotatable relative to a valve sleeve part when the driver-applied torque on the steering wheel is above a second predetermined level and below the first predetermined level, the valve core part and the valve sleeve part being rotatable with each other when the driver-applied torque on the steering wheel is above the first predetermined level.

5. The apparatus for turning steerable wheels of a vehicle as defined in claim 1, the apparatus further being defined by:

rotatable valve parts for controlling fluid flow to the first motor.

6. The apparatus for turning steerable wheels of a vehicle as defined in claim 5, the apparatus further being defined by:

the valve parts including a valve core part and a valve sleeve part, a portion of the valve core part being contained within and being rotatable relative to the valve sleeve part, a manually rotatable shaft being fixedly connected to the valve core part.

7. The apparatus for turning steerable wheels of a vehicle as defined in claim 1, the apparatus further being defined by:

the torque sensor sensing the driver-applied torque, when the driver-applied torque reaches a predetermined level, the torque sensor communicating a torque signal to the second motor.

8. The apparatus for turning steerable wheels of a vehicle as defined in claim 7, the apparatus further being defined by:

a motor drive circuit for said second motor, the torque signal being received by the motor drive circuit, the motor drive circuit controlling the second motor.

9. The apparatus for turning steerable wheels of a vehicle as defined in claim 1, the apparatus further being defined by:

the second motor being connected with an axial end of the first motor between the steering wheel and the first motor.

\* \* \* \* \*